United States Patent
Johnson et al.

(10) Patent No.: US 10,450,630 B2
(45) Date of Patent: Oct. 22, 2019

(54) RECOVERY PROCESS

(71) Applicant: Li-Technology Pty Ltd, Belmont, Western Australia (AU)

(72) Inventors: Gary Donald Johnson, Belmont (AU); Mark Daniel Urbani, Wattle Grove (AU); Nicholas John Vines, High Wycombe (AU)

(73) Assignee: Li-Technology Pty Ltd., Belmont (AU)

( * ) Notice: Subject to any disclaimer, the term of this patent is extended or adjusted under 35 U.S.C. 154(b) by 233 days.

(21) Appl. No.: 15/514,688

(22) PCT Filed: Oct. 9, 2015

(86) PCT No.: PCT/AU2015/000608
§ 371 (c)(1),
(2) Date: Mar. 27, 2017

(87) PCT Pub. No.: WO2016/054683
PCT Pub. Date: Apr. 14, 2016

(65) Prior Publication Data
US 2017/0233848 A1    Aug. 17, 2017

(30) Foreign Application Priority Data

Oct. 10, 2014    (AU) ................. 2014904050

(51) Int. Cl.
*C22B 3/22* (2006.01)
*C22B 3/08* (2006.01)
(Continued)

(52) U.S. Cl.
CPC ............... *C22B 3/22* (2013.01); *C01D 15/08* (2013.01); *C01F 7/0686* (2013.01); *C22B 1/00* (2013.01);
(Continued)

(58) Field of Classification Search
CPC .... C22B 3/20; C22B 3/22; C22B 1/00; C22B 3/06; C22B 3/08; C22B 3/44; C01D 15/08; C01F 7/0686
See application file for complete search history.

(56) References Cited

U.S. PATENT DOCUMENTS 2,044,018 A * 6/1936 Rosett .................... C01D 15/04
23/296
2,940,820 A   6/1960 Mazza et al.
(Continued)

FOREIGN PATENT DOCUMENTS

CA    1150063 A    7/1983
CA    1297265 C *  3/1992
(Continued)

OTHER PUBLICATIONS

Fleet, M. E. et al. Rock-forming Minerals: Micas. 2nd edition. London. pages 650, 653, & 654. (Year: 2003).*
(Continued)

*Primary Examiner* — Tima M. McGuthry-Banks
(74) *Attorney, Agent, or Firm* — Harness, Dickey & Pierce, P.L.C.

(57) ABSTRACT

A process for the recovery of lithium from lithium bearing mica rich minerals, the process comprising passing an ore containing one or more lithium bearing mica rich minerals to at least one pre-treatment step, passing the pre-treated ore to an acid leach step thereby producing a pregnant leach solution, subjecting the pregnant leach solution to a series of process steps in which one or more impurity metals are removed, and recovering lithium as a lithium containing salt product.

26 Claims, 6 Drawing Sheets

(51) Int. Cl.

| | | |
|---|---|---|
| *C22B 3/44* | (2006.01) | |
| *C01D 15/08* | (2006.01) | |
| *C22B 1/00* | (2006.01) | |
| *C22B 3/20* | (2006.01) | |
| *C01F 7/06* | (2006.01) | |

(52) U.S. Cl.
CPC ............... *C22B 3/08* (2013.01); *C22B 3/20* (2013.01); *C22B 3/44* (2013.01)

(56) References Cited

U.S. PATENT DOCUMENTS

| | | |
|---|---|---|
| 3,189,407 A | 6/1965 | Botton et al. |
| 4,367,215 A | 1/1983 | Gjelsvik et al. |

FOREIGN PATENT DOCUMENTS

| | | | |
|---|---|---|---|
| CN | 85101989 A | * | 9/1986 |
| CN | 102139894 A | * | 8/2011 |
| CN | 102173438 A | * | 9/2011 |
| CN | 101974684 B | | 4/2012 |
| CN | 102649996 A | | 8/2012 |
| CN | 102849759 A | * | 1/2013 |
| CN | 102718234 B | * | 5/2014 |
| JP | 2009270189 A | | 11/2009 |

OTHER PUBLICATIONS

CN 85101989 A machine translation. (Year: 1986).*
CN 102849759 machine translation. (Year: 2013).*
CN 102139894 machine translation (Year: 2011).*
CN 102718234 B machine translation (Year: 2014).*
CN 102173438 machine translation (Year: 2011).*
"Alunite." Mineral Data Publishing, Version 1. Copyright 2001-2005. http://rruff.info/doclib/hom/alunite.pdf (Year: 2005).*
International Search Report and Written Opinion of the ISA for PCT/AU2015/000608, ISA/AU, Woden ACT, dated Nov. 6, 2015.
International Preliminary Report on Patentability with annexes (Ch.II) for PCT/AU2015/000608, IPEA/AU, dated Jun. 6, 2016.
Office Action dated Mar. 4, 2019 in corresponding JP Application No. 2017-518134.

* cited by examiner

RECOVERY PROCESS

CROSS-REFERENCE TO RELATED APPLICATIONS

This application is a 371 U.S. National Stage of International Application No. PCT/AU2015/000608, filed Oct. 9, 2015, which claims the benefit of and priority to Australian Patent Application No. 2014904050, filed Oct. 10, 2014. The disclosures of the above applications are incorporated herein by reference.

FIELD

The present disclosure relates to a process for the recovery of lithium from mica rich minerals. More particularly, the process of the present invention is intended to allow the recovery of lithium, potassium, rubidium, cesium, fluorine and/or aluminium as products from lithium rich mica minerals, including but not limited to lepidolite and zinnwaldite.

The process of the present disclosure consists of a novel and improved combination of operating steps, one or more of which may have been used previously, in other combinations and for other purposes, in mineral processing and hydrometallurgical processes.

BACKGROUND

The major sources of commercially mined $Li_2CO_3$ have historically come from brine solution and spodumene containing ores. To date, there has been no commercial production of $Li_2CO_3$ from lepidolite rich ores or concentrates. Lepidolite is present in many pegmatite deposits, and co-exists with spodumene in some pegmatites. The presence of lepidolite is problematic for refineries that produce $Li_2CO_3$ from spodumene concentrate. As such, the lithium content of lepidolite holds no value and is rejected at the spodumene concentrator.

There have been several efforts to recover lithium from lepidolite in the laboratory and one commercial application. Importantly, none of these prior art efforts have involved direct leaching of the mineral.

A process to extract lithium from lepidolite and produce LiOH is described in U.S. Pat. No. 2,940,820, lodged in 1958. The process was implemented by the American Potash & Chemical Co (operating as American Lithium Chemicals Co) in 1955-1960. Lepidolite was mixed with limestone at a mass ratio of 3:1 then wet ball milled. The discharge from the mill was then filtered and the filter cake was subject to roasting in a rotary kiln at 911° C. The discharge was quenched, milled and then leached in a counter-current mixer settler system. Aluminium impurities were precipitated by the addition of lime and the precipitate was removed by filtration. The filtrate was then evaporated to force the crystallization of $LiOH.H_2O$ of relatively low purity. These crystals were purified by re-crystallization to produce a saleable product. This process relies on low power and limestone costs to be viable, which significantly limits its widespread application.

U.S. Pat. No. 3,189,407 describes a process in which lithium is said to be recovered from low lithium minerals, such as lepidolite, by reaction of the mineral with sulfuric acid and lithium is ultimately precipitated from solution. In this process, lepidolite is first pulped with acid and heated to a temperature of between 140° C. and 200° C., preferably 150° C. to 170° C. (an acid bake) in what is said to be an effort to react only with the lepidolite and not the gangue that may be present. The bake is run over a period of up to 4 hours and only small levels of aluminium and potassium are said to be dissolved. Most of the water present evaporates during the bake, leaving a product substantially in the form of a thick paste, not what might typically be described as a slurry. This paste is then re-pulped in water. Aluminium is then precipitated through the addition of an alkali or alkali earth carbonate to increase the pH to between 3.5 to 4.5. The recovery process of the present disclosure has as one object thereof to substantially overcome the problems associated with the prior art or to at least provide a useful alternative thereto.

The preceding discussion of the background art is intended to facilitate an understanding of the present disclosure only. It should be appreciated that the discussion is not an acknowledgement or admission that any of the material referred to was part of the common general knowledge in Australia or any other country or region as at the priority date of the application.

Throughout the specification and claims, unless the context requires otherwise, the word "comprise" or variations such as "comprises" or "comprising", will be understood to imply the inclusion of a stated integer or group of integers but not the exclusion of any other integer or group of integers.

Throughout the specification and claims, unless the context requires otherwise, the word "mica", "micas" or obvious variations thereof will be understood to refer to the group of complex hydrous aluminosilicate minerals that crystallize with a sheet or plate-like structure. Specifically, the mica referred to herein is to be understood to refer to lithium containing mica.

DISCLOSURE

In accordance with the present disclosure there is provided a process for the recovery of lithium from lithium bearing mica rich minerals, the process comprising passing an ore containing one or more lithium bearing mica rich minerals to at least one pre-treatment step, passing the pre-treated ore to an acid leach step thereby producing a leach slurry that is in turn passed to a solid liquid separation step, the separation step producing a leach residue and a pregnant leach solution, subjecting the pregnant leach solution to a series of process steps in which one or more impurity metals are removed, and recovering lithium as a lithium containing salt product.

Preferably, the lithium containing salt is $Li_2CO_3$. Additional products may preferably include a potassium containing salt, not limited to but preferably $K_2SO_4$, a rubidium containing salt, not limited to but preferably $Rb_2SO_4$, a cesium containing salt, not limited to but preferably $Cs_2SO_4$, a fluorine salt, aluminium as a salt or alumina, and a silica containing product, preferably $Na_2SiO_3$.

Preferably, the fluorine salt comprises a mixture of aluminium fluoride and alumina. Such a mixture is envisaged to be suitable for use as a feed constituent in the electrolytic cells employed in aluminium production, rather than the currently used aluminium fluoride. The aluminium fluoride that is conventionally used is typically prepared by the reaction of aluminium hydroxide with hydrogen fluoride as the mixture added to electrolytic cells must be substantially free from impurities.

Preferably, the mica rich minerals include lepidolite and/or zinnwaldite.

Preferably, the pre-treatment step comprises one or both of a concentration step and a milling step. The milling step may preferably be a fine milling step. The concentration step may be a flotation step.

Still preferably, the milling step produces a product having a particle size of <$P_{80}$ 150 micron.

Still further preferably, the milling step (ii) produces a product having a particle size of <$P_{80}$ 75 micron.

Preferably, concentrated sulfuric acid is added during the leach step.

Still preferably, the acid leach step results in at least a proportion of the contained lithium, potassium, aluminium, rubidium, fluorine and cesium being extracted into solution, thereby forming the pregnant leach solution ("PLS").

Preferably, the leach residue contains silica. The leach residue preferably contains primarily amorphous silica. More preferably, the concentration of silica is in the range of about 60-90%

Preferably, the leaching step is conducted under atmospheric conditions.

The leaching step is preferably conducted at a temperature close to boiling, for example at or about 120° C.

The leaching step is preferably carried out with an excess of $H_2SO_4$ providing a free acid concentration of greater than about 50 g/L $H_2SO_4$.

Still preferably, the total sulfate concentration is close to the saturation limit of the solution at the leaching temperature. For example, this may be 6.0M S at >90° C.

Still further preferably, in the leach step greater than about 90% metal extraction is achieved with a retention time of about 12 hours.

Preferably, selective crystallization is utilized to precipitate mixed monovalent alum salts from the pregnant leach solution by cooling with or without evaporation. Precipitated salts may preferably include $KAl(SO_4)_2.12H_2O$, $RbAl(SO_4)_2.12H_2O$ and $CsAl(SO_4)_2.12H_2O$. The addition of $K_2SO_4$, $Rb_2SO_4$ and/or $Cs_2SO_4$ may be used to increase the recovery of Al.

Preferably, monovalent-alum salts are separated from the solution after alum crystallization by filtration or decantation. The filtrate formed preferably contains a large proportion of the lithium contained from the initial ore or concentrate, preferably greater than about 95%.

Still preferably, impurities present in the lithium containing filtrate, are removed by precipitation through the addition of a base in a low pH impurity removal step. The base is preferably one or more of limestone, lime or monovalent carbonate or hydroxide salts. The precipitated impurities preferably include sulfuric acid, aluminium, chromium and iron.

Preferably, solids from the low pH impurity removal step are washed with water to recover entrained lithium.

From the low pH impurity removal step filtrate is passed to a high pH impurity removal step, in which impurity base metals are precipitated through the addition of a base. The base is preferably lime and/or a monovalent hydroxide salt. The impurity base metals may preferably include manganese and magnesium.

Preferably, calcium is precipitated from the filtered product of the high pH impurity removal step by the addition of a monovalent carbonate salt. The carbonate salt is preferably one of $Li_2CO_3$, $Na_2CO_3$ or $K_2CO_3$.

Still preferably, lithium carbonate is precipitated by the addition of a monovalent carbonate salt to the filtered product of calcium precipitation. The carbonate salt is preferably one of $Na_2CO_3$ or $K_2CO_3$. Separation of the lithium carbonate is preferably effected by filtration or decantation.

Preferably, the mixed monovalent alum salts are re-dissolved in water and passed to selective precipitation to precipitate $Al(OH)_3$. The selective precipitation may be effected through the addition of one or more of limestone, lime, monovalent carbonate and hydroxide salts.

Preferably, precipitated $Al(OH)_3$ from selective precipitation is separated by filtration or decantation, whereby a resulting filtrate contains monovalent cation salts. The monovalent cation salts are preferably separated by selective crystallization.

Still preferably, any rubidium and cesium sulfates are further processed to form other salts. In one form of the present disclosure the rubidium and cesium sulfates are further processed to provide formates.

In one form of the present disclosure the process for the recovery of lithium from lithium bearing mica rich minerals comprises the method steps of:

(i) Separation of the lithium bearing mineral, lepidolite, from gangue minerals by a first pre-treatment step being froth flotation to produce a concentrate;

(ii) Fine milling the concentrate in a second pre-treatment step;

(iii) Leaching in sulfuric acid solution under atmospheric conditions to provide a leach slurry that is in turn passed to a solid liquid separation step, the separation step producing a leach residue and a pregnant leach solution containing soluble lithium, potassium, rubidium, cesium and aluminium sulfates and extracted fluorine;

(iv) Selectively crystallising the mixed monovalent alum salts by cooling with or without evaporation;

(v) Separation of the monovalent-alum salts from the liquor by filtration or decantation, whereby the resulting filtrate contains the large proportion of the lithium contained from the initial ore or concentrate;

(vi) Impurities present in the lithium containing filtrate, including $H_2SO_4$, aluminium, chromium and iron, are removed by precipitation using a suitable base, including limestone, lime, or monovalent carbonate or hydroxide salts;

(vii) Separation of the impurity metals and sulfate from the liquor by filtration or decantation whereby the resulting filtrate contains the large majority of the lithium contained from the pregnant leach solution, and washing the solids with water to recover entrained lithium;

(viii) Precipitation of impurity base metals, including manganese and/or magnesium, using a base, which may be lime or a monovalent hydroxide salt;

(ix) Separation of the impurity metals and sulfate from the liquor by filtration or decantation whereby the resulting filtrate contains the large majority of the lithium contained from the pregnant leach solution, and washing the solids with water to recover entrained lithium;

(x) Precipitation of calcium ions by the addition of a monovalent carbonate salt;

(xi) Separation of the precipitated calcium salt from the liquor by filtration or decantation whereby the resulting filtrate contains the large majority of the lithium contained from the pregnant leach solution;

(xii) Precipitation of lithium carbonate by the addition of a monovalent carbonate salt and separation of the lithium salt from the liquor by filtration or decantation;

(xiii) Crystallization of monovalent sulfate salts from filtrate by salting out and/or evaporation;

(xiv) Re-dissolving the mixed monovalent alum salts of step (iv) in water and subjecting same to selective precipitation using limestone, lime or monovalent carbonate or hydroxide salts, to precipitate $Al(OH)_3$;

(xv) Separation of the precipitated $Al(OH)_3$ from the liquor by filtration or decantation whereby the resulting filtrate contains monovalent cation salts; and (xvi) Separating the monovalent cation salts by selective crystallization.

Preferably, rubidium and cesium sulfates may be further processed to form other salts. In one form of the present disclosure the rubidium and cesium sulfates are further processed to form formates.

The large majority of the lithium contained from the pregnant leach solution as detailed in each of steps (vii), (ix) and (xi) is preferably greater than about 95%.

Preferably, the milling step (ii) produces lepidolite ore or concentrate at a particle size of <$P_{80}$ 150 micron.

Still preferably, the milling step (ii) produces the lepidolite ore or concentrate at a particle size of <$P_{80}$ 75 micron.

Preferably, the leach residue contains a high concentration of silica. It is envisaged that this silica may be a commercially useful product.

Preferably, the leaching step (iii) is conducted under atmospheric conditions at a temperature close to boiling and should be carried out with an excess of $H_2SO_4$ allowing for a free acid concentration of >50 g/L $H_2SO_4$.

Still preferably, the total sulfate concentration should be such that it is close to the saturation limit of the solution at the leaching temperature. For example, this could be 6.0M S at >90° C. Under these conditions >90% metal extraction is achieved within 12 hours.

Preferably, the selective crystallization step (ix) in which the monovalent alum salts are crystallized is to be conducted at a temperature less than the leaching temperature and the yield is increased by concentration of the liquor by evaporation and/or the addition of monovalent sulfate salts, preferably $Cs_2SO_4$.

Still preferably, the crystallization step (ix) can be achieved by forced cooling of the leach liquor. The reduction in temperature from that of the leach stage initiates alum crystallization. The crystals are recovered by filtration and washed with water or a solution containing monovalent alum salts.

Preferably, the low pH impurity removal stage (vii) should be operated at a pH of <7 using limestone. Limestone is preferred as it is a cheap base and removes sulfate as gypsum.

Preferably, the high pH impurity removal stage (viii) should be operated at a pH of >9 using lime. Lime is preferred as it is a cheap base and removes sulfate as gypsum.

Preferably, the calcium precipitation step (x) is conducted by the addition of $Li_2CO_3$ product and the precipitated $CaCO_3$ is recycled to stage (vi). Washing the precipitate is not required.

Preferably, the $Li_2CO_3$ precipitation stage (xii) is operated at elevated temperature and the liquor volume is reduced by evaporation. This will result in a higher lithium recovery. For example, this may be >90° C.

In one form the present disclosure allows the recovery of fluoride, wherein the additional method steps are utilized:
a) Selective crystallization of khademite, a double salt of aluminium fluoride and aluminium sulfate, from the filtrate arising from the separation of monovalent-alum salts from the leach liquor; and
b) Separation of the khademite from the liquor by filtration or decantation wherein the resulting filtrate contains the large majority of the lithium contained in the pregnant leach solution.

Preferably, the Khademite is re-dissolved in water and subject to precipitation of aluminium hydroxyl fluoride using $Al(OH)_3$. The $Al(OH)_3$ utilized is preferably formed elsewhere in the process of the present disclosure.

Preferably, the aluminium hydroxyl fluoride is separated from the liquor by filtration or decantation such that the resulting filtrate contains aluminium sulfate. The aluminium sulfate is preferably directed to step (i) above. It is understood that the addition of aluminium sulphate allows for an increases recovery of khademite.

Still preferably, the large majority of the lithium in step (ii) above is greater than about 95%.

The aluminium hydroxyl fluoride is preferably calcined in the temperature range of 350° C. to 600° C. to produce the aluminium fluoride aluminium oxide mixture.

In one form of the present disclosure the khademite is roasted at >700° C. to produce a mixture of $AlF_3$ and $Al_2O_3$. The khademite may be further refined if desired.

Preferably, khademite is initially recovered by continued agitation of the liquor with the addition of khademite as seed at step (i) above to increase the rate of crystallization.

In accordance with a further embodiment of the present disclosure a silicate product may be recovered from the acid leach residue, utilising the following additional method steps:
(i) Leaching the silica containing leach residue with sodium hydroxide solution to produce a leach slurry; and
(ii) Filtering and washing the leach slurry to produce a leach residue depleted in amorphous silica and a leach liquor containing sodium silicate.

Preferably, changing the sodium hydroxide concentration and/or percent solids in the leach allows the production of different grades or $SiO_2/Na_2O$ ratios. The leach preferably proceeds within about 15 minutes. Higher extractions are achievable with higher temperatures. Preferably, the extraction of amorphous silica is in the range of 70-95%. More preferably, the ratio of $SiO_2/Na_2O$ is up to 3.5:1.

BRIEF DESCRIPTION OF THE DRAWINGS

The process of the present disclosure will now be described, by way of example only, with reference to one embodiment thereof and the accompanying drawings, in which:—

BEST MODE(S) FOR CARRYING OUT THE DISCLOSURE

Figure 1A:
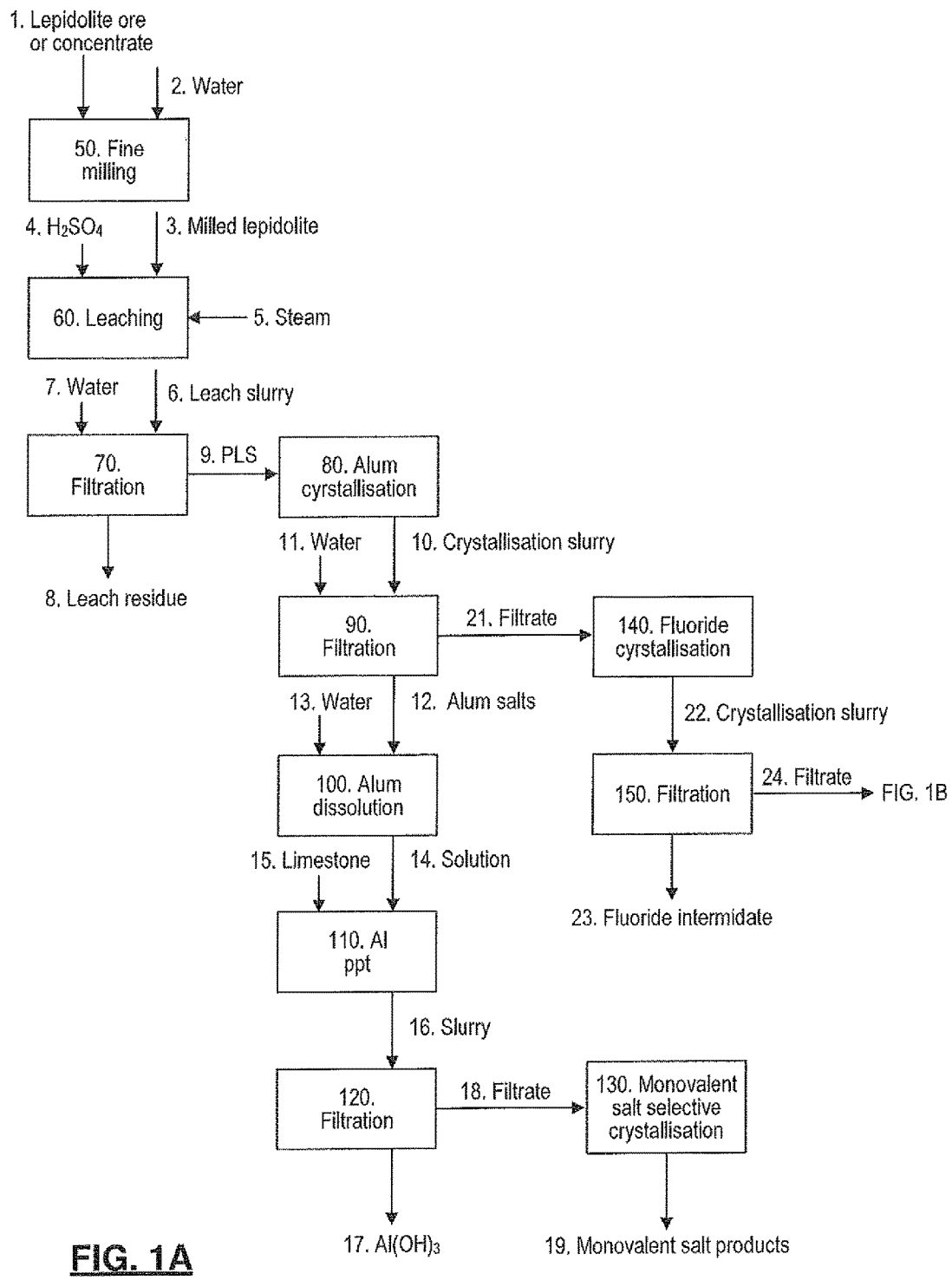
FIGS. 1A and 1B comprise a flow sheet depicting a process for the recovery of lithium from mica rich minerals in accordance with the present disclosure, showing as one embodiment in particular a process for recovery of each of lithium, rubidium, cesium, potassium, fluorine and aluminium from lepidolite ore or concentrate by acid leach, alum crystallization, impurity removal, $Li_2CO_3$ recovery, Al(OH)s precipitation, khademite precipitation, and rubidium, cesium, potassium sulfate crystallization.

The process of the present disclosure comprises a novel and improved combination of operating steps, one or more of which may have been used previously, in other combinations and for other purposes, in mineral processing and hydrometallurgical processes.

In very general terms, in one embodiment of the present disclosure, a lithium containing mineral, lepidolite, is pre-concentrated, if required, by a mineral separation process, for example flotation. The lepidolite ore or concentrate is then subjected to a pre-treatment step comprising, for example, fine milling. The lithium, potassium, rubidium, cesium, fluorine and aluminium present in lepidolite are extracted by strong sulfuric acid leaching, producing a leach liquor containing lithium, potassium, rubidium, cesium, fluorine and aluminium and a leach residue containing silica. A majority of the potassium, rubidium, cesium, fluorine and aluminium present in the leach liquor are separated from lithium as mixed sulfate salts. Hydrometallurgical techniques such as selective precipitation and crystallization separate potassium, rubidium, cesium, fluorine and aluminium from the mixed sulfate salt into potentially saleable products, including, but not limited to, $Al(OH)_3$ and $K_2SO_4$, $Rb_2SO_4$, $AlFSO_4$ and $Cs_2SO_4$. Lithium is separated from residual impurities, including, but not limited to, sulfuric acid, aluminium, iron, manganese, calcium, rubidium, cesium and potassium by hydrometallurgical techniques, such as selective precipitation and crystallization, to produce saleable $Li_2CO_3$.

Lepidolite is a lilac-grey or rose coloured lithium phyllosilicate (mica group) mineral and a member of the polylithionite-trilithionite series. The standard chemical formula for Lepidolite is $K(Li,Al)_3(Al,Si)_4O10(F,OH)_2$, although it is understood this may vary. It occurs in granite pegmatites, high temperature quartz veins, greisens and granites. Associated minerals include quartz, feldspar, spodumene, amblygonite, tourmaline, columbite, cassiterite, topaz and beryl. Lepidolite can contain up to 7.7% $Li_2O$. The lepidolite in pegmatite bodies can be separated from the gangue minerals by flotation, or classification.

It is envisaged that the processes of the present disclosure are applicable to any lithium bearing mica ores, such as lepidolite, but also including zinnwaldite. Zinnwaldite is a lithium containing silicate mineral in the mica group, generally light brown, grey or white in colour, and having the chemical formula $KLiFeAl(AlSi_3)O_{10}(OH,F)_2$.

In one form of the present disclosure the process comprises the method steps of:

(i) Separation of the lithium containing mineral, lepidolite, from gangue minerals, such as quartz and feldspar, by froth flotation, if required, to produce a lepidolite concentrate;

(ii) Fine milling the lepidolite concentrate;

(iii) Leaching lepidolite in sufficient sulfuric acid solution under atmospheric conditions to enable the lithium, potassium, rubidium, cesium and aluminium to be converted to soluble sulfates and to also extract any fluorine present, forming a pregnant leach solution;

(iv) Selective crystallization of the mixed monovalent alum salts including $KAl(SO_4)_2.12H_2O$, $RbAl(SO_4)_2.12H_2O$ and $CsAl(SO_4)_2.12H_2O$ by cooling with or without evaporation. The addition of $K_2SO_4$, $Rb_2SO_4$ and/or $Cs_2SO_4$ can be used to increase the recovery of Al if required;

(v) Separation of the monovalent-alum salts from the liquor by filtration or decantation in which the resulting filtrate contains the large majority of the lithium contained from the initial lepidolite ore or concentrate;

(vi) Impurities present in the lithium containing filtrate, such as $H_2SO_4$, aluminium, chromium and iron are removed by precipitation using a suitable base, such as limestone, lime or monovalent carbonate or hydroxide salts, but preferably limestone. The pH of the solution is increased by the addition of the base to allow for the neutralisation and precipitation of the impurities;

(vii) Separation of the impurity metals and sulfate from the liquor by filtration or decantation in which the resulting filtrate contains the large majority of the lithium contained from the initial lepidolite ore or concentrate. The solids are washed with water to recover entrained lithium;

(viii) Precipitation of impurity base metals, such as, but not limited to, manganese and magnesium, using a suitable base, such as lime or monovalent hydroxide salts, but preferably lime;

(ix) Separation of the impurity metals and sulfate from the liquor by filtration or decantation in which the resulting filtrate contains the large majority of the lithium contained from the initial lepidolite ore or concentrate. The solids are washed with water to recover entrained lithium;

(x) Precipitation of calcium ions by the addition of a monovalent carbonate salt, such as $Li_2CO_3$, $Na_2CO_3$ or $K_2CO_3$;

(xi) Separation of the precipitated calcium salt from the liquor by filtration or decantation in which the resulting filtrate contains the large majority of the lithium contained from the initial lepidolite ore or concentrate;

(xii) Precipitation of $Li_2CO_3$ by the addition of a monovalent carbonate salt, such as $Na_2CO_3$ or $K_2CO_3$. Separation of the lithium salt from the liquor by filtration or decantation;

(xiii) Crystallization of monovalent sulfate salts from filtrate by salting out and/or evaporation;

(xiv) The mixed monovalent alum salts are re-dissolved in water and subject to conventional hydrometallurgical techniques, such as, but not limited to selective precipitation using limestone, lime or monovalent carbonate or hydroxide salts to precipitate $Al(OH)_3$;

(xv) Separation of precipitated $Al(OH)_3$ from the liquor by filtration or decantation in which the resulting filtrate contains monovalent cation salts; and (xvi) The monovalent cation salts are separated by selective crystallization. Rubidium and cesium sulfates can be further processed if required to form other salts, for example formates.

Fluoride recovery can be achieved in the context of the process of the present disclosure also, utilising these additional method steps:

c) Selective crystallization of khademite, a double salt of aluminium fluoride and aluminium sulfate, from the filtrate is recovered at step (v) below. Khademite is recovered by continued agitation of the liquor with the addition of khademite as seed to increase the rate of crystallization.

d) Separation of the khademite from the liquor by filtration or decantation in which the resulting filtrate contains the large majority of the Li contained from the initial Li-mica ore or concentrate;

e) Khademite can be refined further if required;

f) Khademite can be re-dissolved in water and subject to precipitation of aluminium hydroxyl fluoride using Al(OH)$_3$ recovered from step (vii). The reaction of which is understood to proceed as follows:

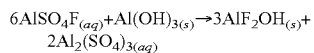

$6AlSO_4F_{(aq)} + Al(OH)_{3(s)} \rightarrow 3AlF_2OH_{(s)} + 2Al_2(SO_4)_{3(aq)}$ g) Separation of the aluminium hydroxyl fluoride from the liquor by filtration or decantation in which the resulting filtrate contains aluminium sulphate, which is directed to step (i). The addition of aluminium sulphate allows for an increased recovery of khademite;

h) The aluminium hydroxyl fluoride is calcined in the temperature range of 350° C. to 600° C. to produce the aluminium fluoride aluminium oxide mixture; and i) Khademite can be roasted at >700° C. to produce a mixture of $AlF_3$ and $Al_2O_3$.

In accordance with a further embodiment of the present disclosure a silicate product may be recovered from the acid leach residue, utilising the following additional method steps:

(iii) Silica rich residue is leached with sodium hydroxide solution to produce a leach slurry; and (iv) Filtering and washing the leach slurry to produce a leach residue depleted in amorphous silica and a leach liquor containing sodium silicate.

The sodium hydroxide reacts exothermically with the amorphous silica present in the acid leach residue to form sodium silicate solution. Different grades or $Na_2O/SiO_2$ ratios can be produced by changing the sodium hydroxide concentration and or percent solids in the leach. The leaching kinetics are rapid reaching equilibrium within about 15 minutes. Higher extractions are achievable with higher temperatures. The sodium silicate product is ready for sale. It is understood that the production of sodium silicate from the acid leach residue in this manner is significantly less complicated than conventional sodium silicate production routes.

Figure 1B:
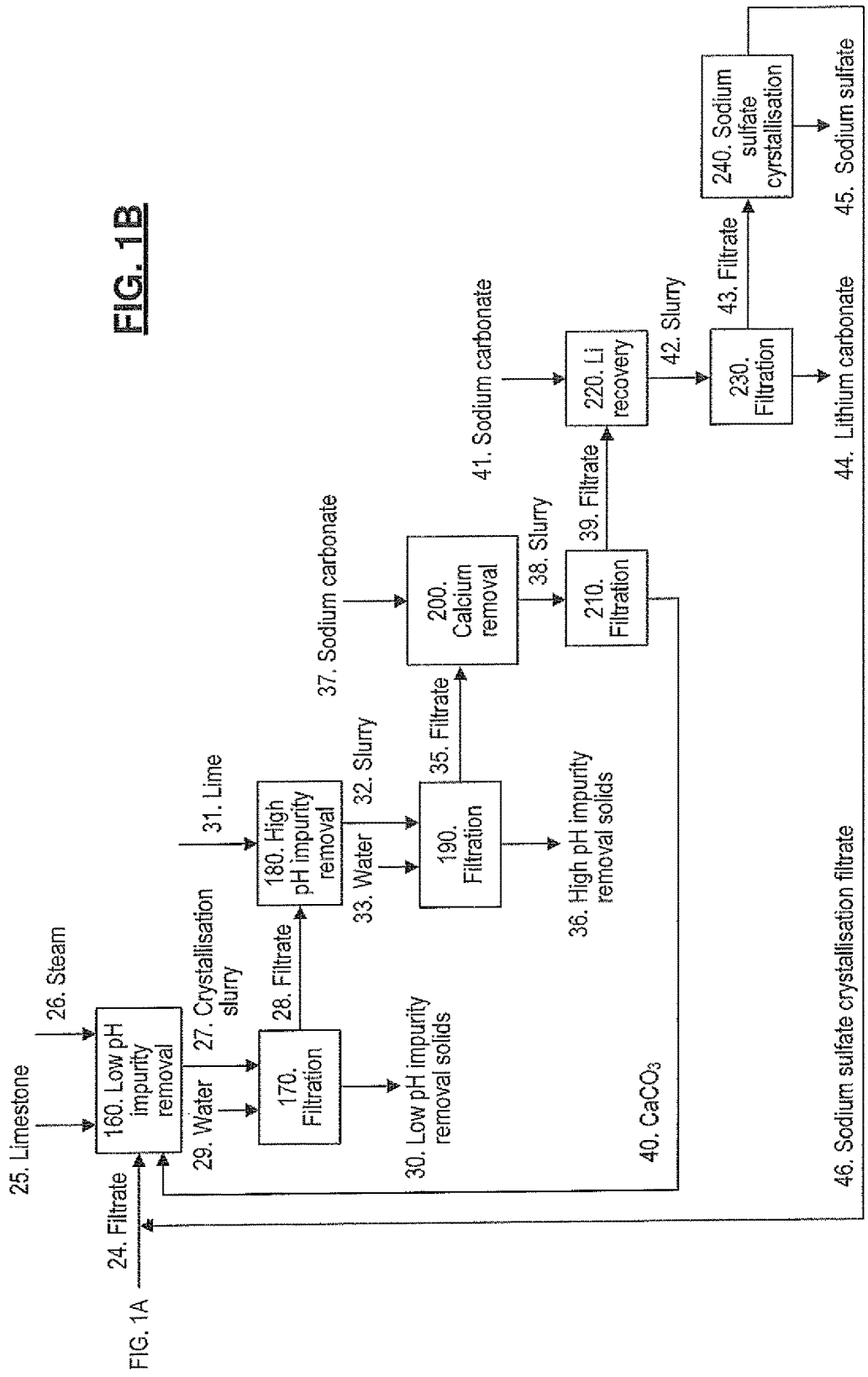

Lepidolite ore or concentrate is treated in accordance with the present disclosure as shown in FIGS. 1A and 1B. The relative grades of the metals in lepidolite are described only by way of example, and the process of the present disclosure is expected to be able to treat any lepidolite bearing material and any lithium bearing mica, not dependent on grade.

In FIGS. 1A and 1B show a flow sheet in accordance with the present disclosure and in which the embodiment depicted is particularly intended for the processing of lepidolite containing ore or concentrate 1 to recover lithium as $Li_2CO_3$ 44 and potassium, rubidium and cesium as separate sulfate salts 19 and aluminium as Al(OH)$_3$ 17.

The lepidolite containing ore or concentrate 1 is passed to a milling step 50, with water 2, in which the ore or concentrate is milled to reduce the particle size, for example to <P$_{80}$ 150 micron and preferably to <P$_{80}$ 75 micron, and enable rapid dissolution of the contained lepidolite. The milled lepidolite slurry 3 is directed to a leach step 60 in which at least a proportion of the contained lithium, potassium, aluminium, rubidium, fluorine and cesium are extracted into solution forming a pregnant leach solution ("PLS"). Concentrated $H_2SO_4$ 4 is added to the leach stage. The leach reactors employed in the leach step 60 are heated using steam 5 to allow for high metal extractions and relatively short retention time. The leach step 60 is conducted at a temperature between about 90 and 130° C., with a retention time of between about 6 and 24 hours.

The leach slurry 6 is passed from the leach step 60 to a solid liquid separation step, for example a belt filter 70, which enables the leach slurry to be filtered at or near the leaching temperature. The filtration stage produces a PLS 9 containing the bulk of the extracted lithium, potassium, aluminium, rubidium, fluorine and cesium and a leach residue 8 with high silica content, which is washed with water 7. The wash filtrate can be combined with the PLS 9 and the leach residue 8 is either discarded, stockpiled for sale, or further processed to produce saleable silica containing products.

The total sulfate concentration in the leach step 60 is such that it is close to the saturation limit of the solution at the leaching temperature. For example, this could be 6.0M S at >90° C. Under these conditions the Applicants have noted >90% metal extraction is achieved within 12 hours.

The PLS 9 from the filter 70 is passed to a monovalent alum crystallization stage 80. The temperature is reduced by applying a negative pressure and/or indirectly cooling, for example using cooling water.

A monovalent alum crystallization slurry 10 is passed through a solid liquid separation stage 90, for example a belt filter, which enables the solids and liquid to be separated at or close to the temperature of the crystallization stage, for example between about 5° C. to 400° C. The filtrate 21 is passed to the fluoride crystallization stage 140 and the solids are washed with water 11.

Washed monovalent alum 12 is dissolved in water 13 in an alum dissolution stage 100, producing an alum solution 14. Aluminium is precipitated from solution by the addition of limestone 15 in an aluminium precipitation stage 110. The precipitation slurry 16 is passed to a solid liquid separation stage 120, which separates the insoluble aluminium hydroxide 17 from the liquor 18. The liquor 18 contains the majority of the potassium, cesium and rubidium from the ore or concentrate and is subject to a selective crystallization step 130. A potassium sulfate product is recovered together with a mixed rubidium sulfate and cesium sulfate product, collectively indicated at 19. The mixed rubidium and cesium product can be further processed, if required, to produce other products, for example rubidium and cesium formates.

The monovalent alum crystallization filtrate 21; exiting the filtration stage 90, contains the majority, typically >99%, of the contained lithium from the lepidolite ore or concentrate 1. It is subject to crystallization of a fluoride containing double salt in the fluoride crystallization stage 140 by mixing with the addition of khademite (AlFSO$_4$.5H$_2$O) as seed (not shown). The crystallization slurry 22 is passed to filtration, for example a solid liquid separation stage 150, which separates the khademite containing solids, being a fluoride intermediate 23, from a fluoride depleted liquor or filtrate 24. The khademite solids 23 can be further processed to produce saleable fluoride products if required.

$H_2SO_4$ is neutralised and impurity elements, such as iron and aluminium, are precipitated from the fluoride crystallization filtrate 24 by the addition of limestone 25 and steam 26 in a low pH impurity removal stage 160. A slurry 27 from stage 160 is passed to solid liquid separation 170 and washing with water 29, and the impurity solids 30 are then discarded.

The low pH impurity removal stage 160 operates under the following conditions. The precipitation of alunite (NaAl$_3$(SO$_4$)$_2$(OH)$_6$) is targeted, which allows the precipitation of fluoride from solution. Fluoride replaces OH in the chemical structure to form (NaAl$_3$(SO$_4$)$_2$(F)$_6$). The Applicants expect both alunites to be present. This requires the addition of monovalent cations such as sodium, potassium and the like. Potassium, rubidium and cesium can replace sodium in the alunite structure. Lithium does not form an alunite. Potassium, rubidium and cesium are present in the liquor from the mica. Sodium is present in the lithium precipitation filtrate (as sodium sulphate) which is used to prepare the reagents as slurry (limestone slurry or lime slurry). This allows for the addition of sodium in this stage of the process of the disclosure.

Alunite precipitates at high temperature (>90° C.) and in the pH range of 2-3, preferably about 2.50. In tests the Applicants have consistently produced alunite and the fluorine concentration has dropped from 5 g/L to <2 g/L.

It is desirable to remove fluoride in this stage as lithium may precipitate as lithium fluoride in the subsequent high pH impurity removal stage. Alunite also filters and dewaters well, so as well as capturing the fluoride, it is also easy to handle.

The filtrate 28 from the low pH impurity removal stage 160, which contains the majority of the contained lithium from the lepidolite ore or concentrate 1, is passed to a high pH impurity removal stage 180. Lime 31 is used to precipitate impurity base metals such as manganese and magnesium. A slurry 32 from stage 180 is passed to a solid liquid separation step 190 and washing with water 33, from which the high pH impurity removal solids 36 are discarded.

The filtrate 35 from the high pH impurity removal stage 180, which contains the majority of the contained lithium from the lepidolite ore or concentrate 1, is subjected to a calcium removal stage 200, which can be a combination of precipitation and ion exchange. Sodium carbonate solution 37 is used to precipitate calcium from solution as $CaCO_3$ 40. A slurry 38 from stage 200 is passed to a solid liquid separation step 210, from which the precipitated $CaCO_3$ 40 and residual lithium is recycled to the low pH impurity removal stage 160.

The filtrate 39 from the calcium precipitation can be further cleaned of calcium by an ion exchange process (not shown), if required.

The filtrate 39 from the calcium removal stage 200, which contains the majority of the contained lithium from the lepidolite ore or concentrate 1 and is low in impurities, is subject to the lithium recovery stage 220. If required, this solution is pre-concentrated by evaporation (not shown). $Na_2CO_3$ 41 is added to the filtrate 39 to force the precipitation of $Li_2CO_3$ 44. Reactors (not shown) employed in stage 220 are heated to allow for high lithium recovery, for example to about 90° C.

A slurry 42 from stage 220 is passed to a solid liquid separation step 230 and washing. A filtrate 43 from step 230 is directed to the sodium sulfate crystallization stage 240 to recover $Na_2SO_4$ 45. The filtrate 46 from this stage is recycled to the low pH impurity removal stage 160.

Figure 2:
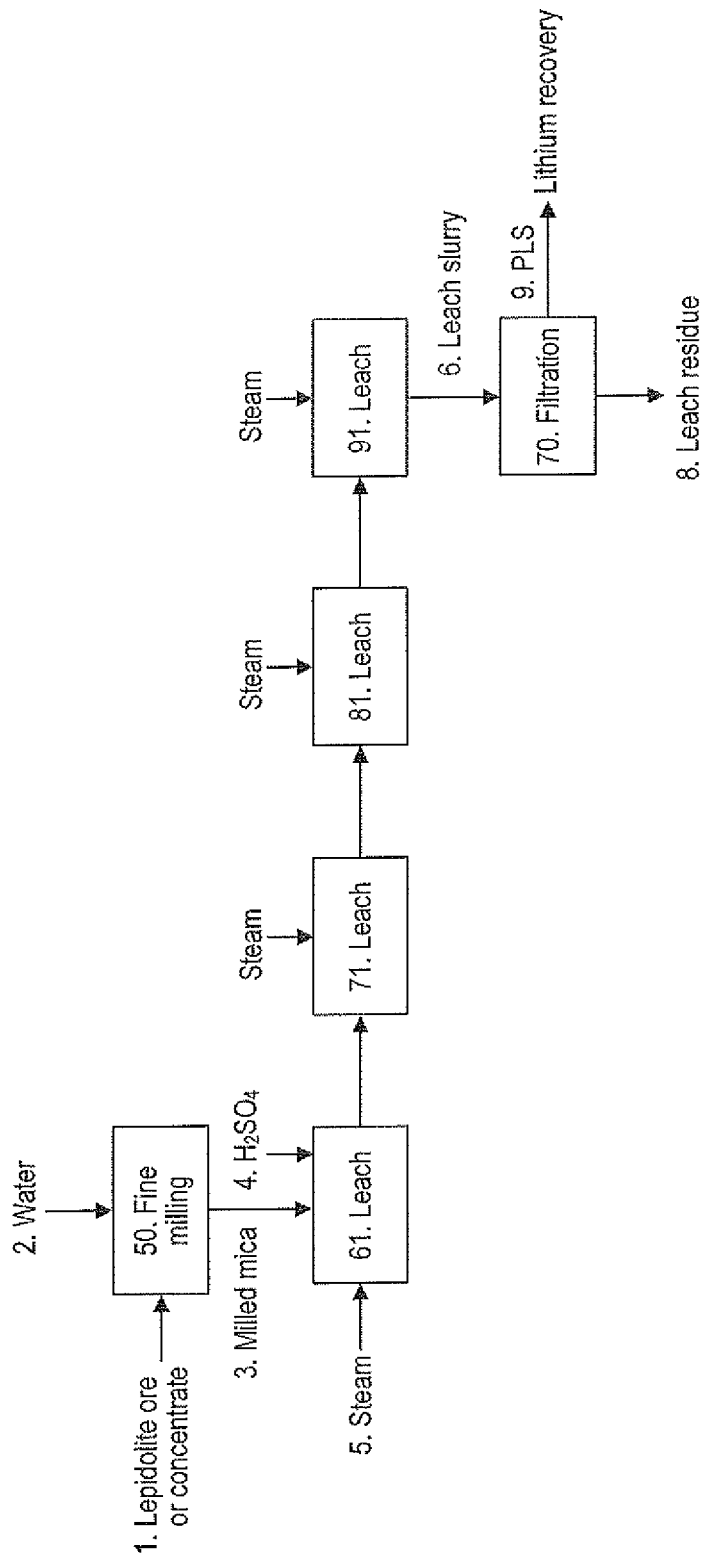
FIG. 2 is a flow sheet depicting in detail the leaching stage of the process of FIG. 1.

In FIG. 2 there is shown a flow sheet in accordance with the leaching stage 60 of the present disclosure. Like numerals denote like parts, steps or processes. The lepidolite containing ore or concentrate 1 is passed to the milling step 50 in which the ore or concentrate is milled, with water 2, to reduce the particle size and enable rapid dissolution of the contained lepidolite, as noted hereinabove. Alternatively, the milling step 50 is a dry milling process. The milled lepidolite 3 is directed to the first of four leach reactors in the leaching stage 60, for example a first leach reactor 61. In leach reactor 61 concentrated sulfuric acid 4 is added at a rate to provide the sulfate ions necessary to form sulfate salts of the relevant cations in the mica and as well as excess to enable a residual sulfuric acid concentration of >50 g/L in the leach liquor. That is, acid is generally added as a ratio control, relative to the feed rate. Steam 5 may also be added to ensure the target temperature of about 120° C. is achieved. The percent solids of the mica containing leach feed is also controlled to target a specific sulfur concentration of the final leach liquor.

Leach slurry discharges from the first leach reactor 61 and enters a second leach reactor 71. Slurry then gravities through the second leach reactor 71 to a third leach reactor 81 and subsequently to a fourth leach reactor 91. The several leach reactors 61, 71, 81 and 91 are required to provide the necessary retention time to achieve adequate extraction of the valuable components from the mica and to minimise short circuiting of slurry to the solid liquid separation step 70. The retention time in the leaching stage 60 is less than about 18 hours, for example between 6 to 18 hours, and in one form about 12 hours. Steam may be added to each of the reactors 71, 81 and 91 also, if required to maintain the target temperature.

The sulfuric acid concentration in the liquor can range from >500 g/L $H_2SO_4$, in particular exiting the earlier reactors, for example reactors 61 and 71, down to >50 g/L $H_2SO_4$ exiting the final reactor 91. The free acid concentration is dependent on the percent solids in the mica feed, and target sulfur concentration in the leach liquor, but is preferably >50 g/L.

Slurry from the fourth reactor 91 is passed to the solid liquid separation step 70, which enables the leach slurry to be filtered at or near the leaching temperature. The filtration stage produces the PLS 9 containing the bulk of the extracted lithium, potassium, aluminium, rubidium, fluorine and cesium and a leach residue 8 with high silica content, which is washed with water. The wash filtrate can be combined with the PLS 9 and the leach residue 8 is either discarded, stockpiled for sale or further processed to produce saleable silica containing products.

Figure 3:
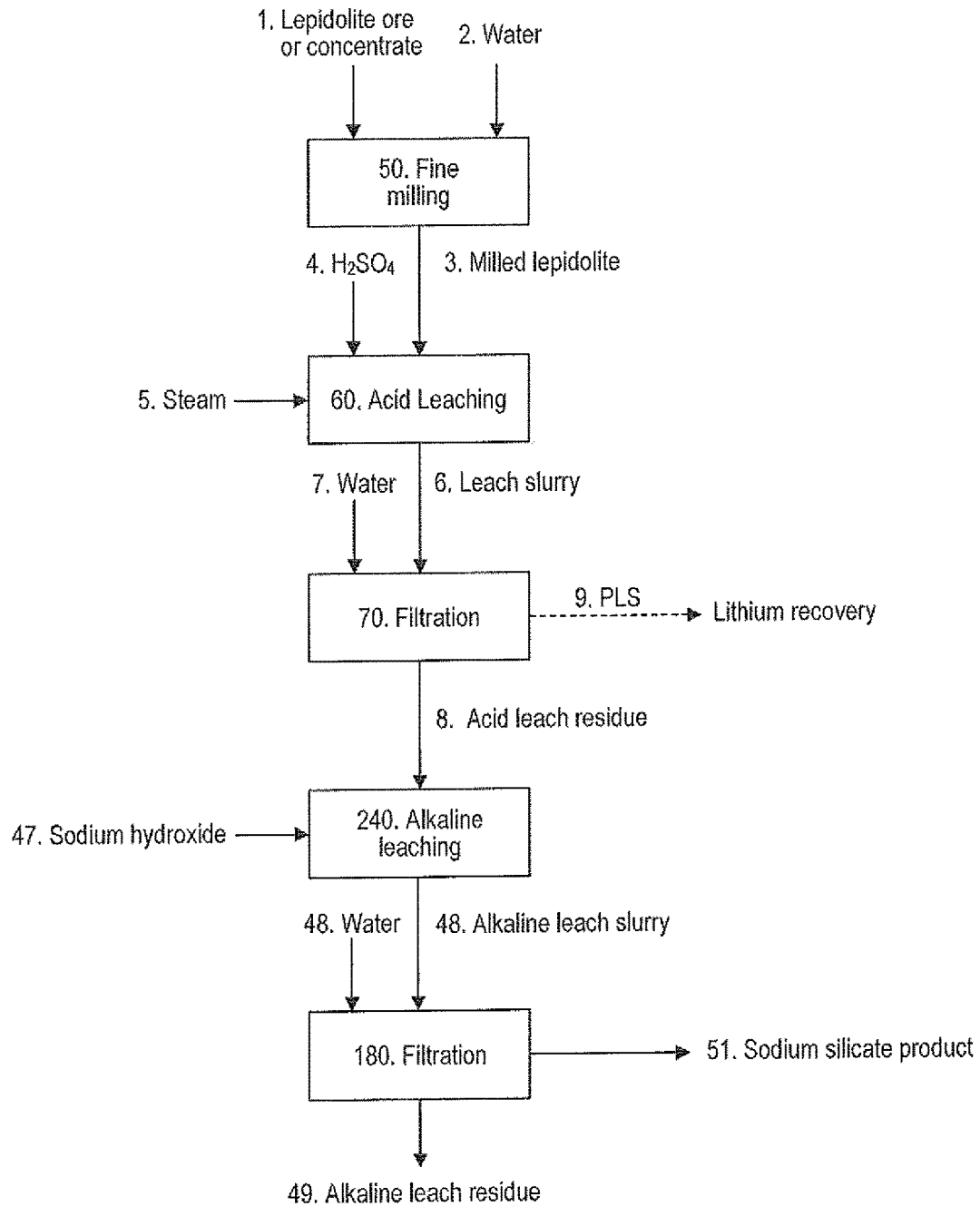
FIG. 3 is a flow sheet depicting how a silicate product is recovered from the acid leach residue of the process of FIGS. 1A and 1B.

In FIG. 3 there is shown a flow sheet in accordance with a second embodiment of the present disclosure and the production of a sodium silicate product 51. Like numerals denote like parts, steps or processes. The lepidolite containing ore or concentrate 1 is passed to the milling step 50 in which the ore or concentrate is milled to reduce the particle size and enable rapid dissolution of the contained lepidolite as noted hereinabove. The milled lepidolite 3 is directed to the acid leach step 60 in which at least a proportion of the contained lithium, potassium, aluminium, rubidium, fluorine and cesium are extracted into solution forming a pregnant leach solution ("PLS"). Concentrated $H_2SO_4$ 4 is added to the leach stage 60 with steam 5 as required.

The acid leach slurry 6 is passed from the leach step 60 to the solid liquid separation step 70, for example a belt filter, which enables the leach slurry 6 to be filtered at or near the leaching temperature. The filtration stage produces an acid leach residue 8 with high silica content, which is washed with water 7 to remove entrained leach liquor.

The acid leach residue 8 is directed to an alkaline leaching stage 240, in which at least a proportion of the contained silica is extracted into solution forming a sodium silicate liquor. Concentrated sodium hydroxide solution 47, for example 50% w/w, is added to the alkaline leach stage. The leaching stage 240 is conducted at atmospheric conditions and at an elevated temperature but less than the boiling point. The leach slurry 48 is passed to a solid liquid separation stage 180, which separates a saleable sodium silicate product 51 as a filtrate, from the insoluble residue 49. The insoluble residue 49 is washed with water 48 to recover entrained sodium silicate, which can be combined with the sodium silicate product 51 or recycled to the alkaline leach stage 240.

Varying the percent solids and the sodium hydroxide concentration, say between about 20 to 50% w/w, in the alkaline leaching stage 240 can produce a variety of sodium silicate grades.

Figure 4A:
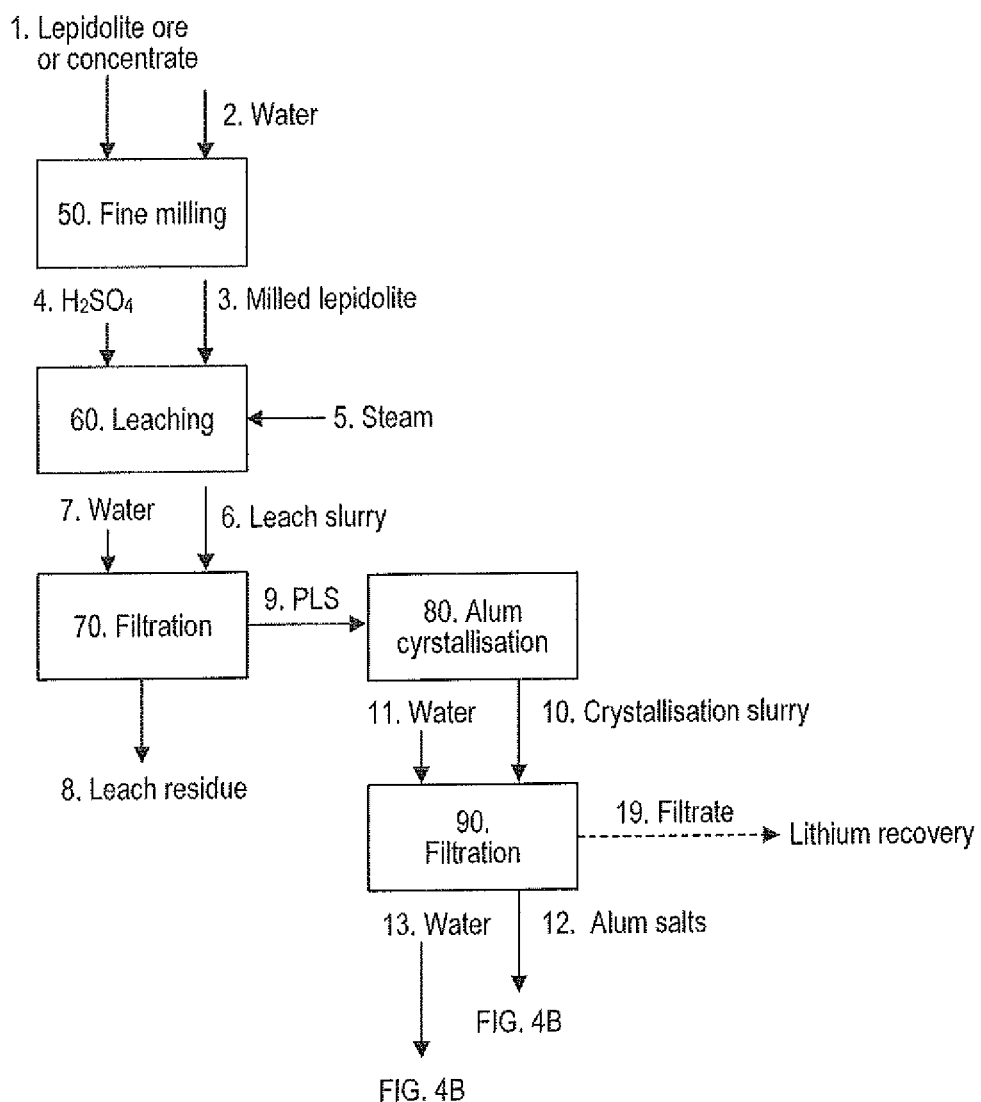
FIGS. 4A and 4B comprise a flow sheet in accordance with a third embodiment of the present disclosure, being the recovery of a rubidium and cesium product.
Figure 4B:
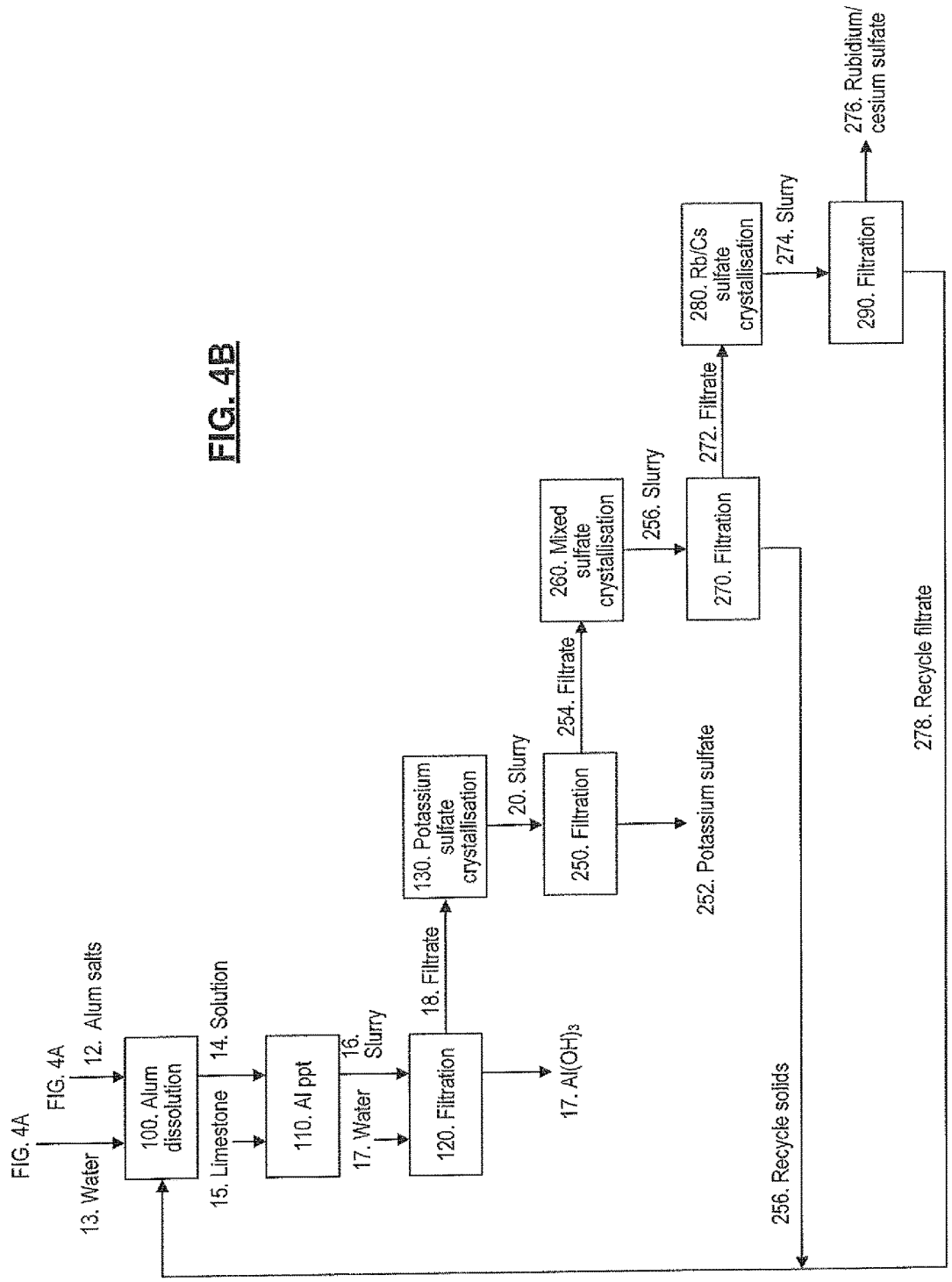

FIGS. 4A and 4B show a flow sheet in accordance with a third embodiment of the present disclosure, being the recovery of a potassium, rubidium and cesium product. Like numerals denote like parts, steps or processes. Washed monovalent alum 12 is dissolved in water 13. Aluminium is precipitated from solution by the addition of limestone 15 in the aluminium precipitation stage 110. The precipitation slurry is passed to the solid liquid separation stage 120, which separates the insoluble aluminium hydroxide 17 from the filtrate or liquor 18. The liquor 18 contains the majority of the potassium, cesium and rubidium from the ore or concentrate and is subject to selective crystallization discussed below.

A potassium sulfate product is recovered by forced crystallization in the potassium sulfate crystalliser 130. A crystallization slurry 20 is passed to a solid liquid separation stage 250, where potassium sulfate 252 is separated from the liquor. A filtrate 254 is passed to a second crystallization stage 260 where the majority of the remaining potassium sulfate and some rubidium and cesium sulfate is crystallized. A slurry 256 from the crystallization stage 260 is passed to a solid liquid separation stage 270, where sulfate salts are separated from the liquor and recycled as recycle solids 258 to the alum dissolution stage 100 to recover those salts.

A filtrate 272 from the mixed crystallization stage 260 is relatively free from potassium sulfate and contains the majority of the rubidium and cesium from the original ore or concentrate 1. The filtrate 272 is subject to crystallization to recover rubidium and cesium as sulfates in the Rb/Cs crystalliser 280. A resulting slurry 274 is passed to a solid liquid separation stage 290 where sulfate salts 276 are separated from a liquor or recycle filtrate 278, also recycled to the alum dissolution stage 100. The mixed rubidium and cesium product can be further processed, as required, to produce other products such as rubidium and cesium formates.

As can be seen from the above description, the process of the present disclosure provides a novel and improved combination of operating steps, one or more of which may have been used commercially, in other combinations and for other purposes, in mineral processing and hydrometallurgical processes. The lithium containing mineral, lepidolite, is able to be pre-concentrated, if required, by a mineral separation process. The lithium, potassium, rubidium, cesium, fluoride and aluminium present in lepidolite are extracted by concentrated sulfuric acid leaching, producing a leach liquor containing lithium, potassium, rubidium, cesium, fluoride and aluminium and a leach residue containing silica. A majority of the aluminium, potassium, rubidium, cesium and fluorine present in the leach liquor are separated from lithium as mixed sulfate salts. Hydrometallurgical techniques including selective precipitation and crystallization are able to be implemented to separate aluminium, potassium, rubidium, cesium and fluorine from the mixed sulfate salt into potentially saleable products. Such saleable products include, but are not limited to, $Al(OH)_3$, $AlF_3$ and $K_2SO_4$, $Rb_2SO_4$ and $Cs_2SO_4$. In the processes of the present disclosure lithium is separated from residual impurities, including, but not limited to, sulfuric acid, aluminium, iron, manganese, calcium, rubidium, cesium and potassium by hydrometallurgical techniques such as selective precipitation and crystallization to in turn produce saleable $Li_2CO_3$. Again as described, useful formate and silicate products may be obtained, as may useful rubidium and cesium products.

The fluorine salts produced in accordance with the present disclosure typically comprise a mixture of aluminium fluoride and alumina. Such a mixture is envisaged to be suitable for use as a feed constituent in the electrolytic cells employed in aluminium production, rather than the currently used aluminium fluoride. The aluminium fluoride that is conventionally used is typically prepared by the reaction of aluminium hydroxide with hydrogen fluoride as the mixture added to electrolytic cells must be substantially free from impurities.

It is envisaged that the feed to the leach at least contains lithium bearing mica but that other components may also be present, including spodumene ore and/or spent lithium battery products. It is further envisaged that the pretreatment step may include roasting.

Modifications and variations such as would be apparent to the skilled addressee are considered to fall within the scope of the present disclosure.

The invention claimed is:

1. A process for the recovery of lithium from lithium bearing mica rich minerals, the process comprising passing an ore containing one or more lithium bearing mica rich minerals to at least one pre-treatment step, passing the pre-treated ore to a leach step in which concentrated sulfuric acid is added under atmospheric conditions thereby producing a leach slurry that is in turn passed to a solid liquid separation step, the separation step producing a leach residue and a pregnant leach solution, subjecting the pregnant leach solution to a series of process steps in which one or more impurity metals are removed, including precipitating alunite in a low pH impurity removal step, and recovering lithium as a lithium containing salt product.

2. The process according to claim 1, wherein the lithium containing salt is $Li_2CO_3$.

3. The process according to claim 1, wherein the process further includes producing additional products, wherein the additional products include one or more of a potassium containing salt, a rubidium containing salt, a cesium containing salt, a fluorine salt, aluminium as a salt or alumina, and a silica containing product.

4. The process according to claim 3, wherein the fluorine salt comprises a mixture of aluminium fluoride and alumina.

5. The process according to claim 1, wherein the mica rich minerals include lepidolite and/or zinnwaldite.

6. The process according to claim 1, wherein the pre-treatment step comprises one or both of a concentration step and a milling step.

7. The process according to claim 6, wherein the milling step produces a product having a particle size of $<P_{80}$ 150 micron.

8. The process according to claim 1, wherein the leach residue contains silica.

9. The process according to claim 8, by which a silicate product is also recovered from the acid leach residue, the process comprising the following additional method steps:
   (i) Leaching the leach residue that contains silica with sodium hydroxide solution to produce a leach slurry; and
   (ii) Filtering and washing the leach slurry to produce a leach residue and a filtrate, the filtrate containing sodium silicate.

10. The process according to claim 1, wherein the leach step is conducted at a temperature of between 90 and 130° C.

11. The process according to claim 10, wherein the leach step is conducted at a temperature of at or about 120° C.

12. The process according to claim 1, wherein the leach step is carried out with an excess of $H_2SO_4$ providing a free acid concentration of greater than about 50 g/L $H_2SO_4$.

13. The process according to claim 12, wherein a total sulfate concentration during the leach step is close to a saturation limit of the slurry at the leaching temperature.

14. The process according to claim 1, wherein the leach step has a retention time of between about 6 to 18 hours.

15. The process according to claim 1, wherein the leach step has a retention time of about 12 hours.

16. The process according to claim 1, wherein selective crystallization is utilized to precipitate mixed monovalent alum salts from the pregnant leach solution by cooling with or without evaporation providing a crystallization slurry.

17. The process according to claim 16, wherein the mixed monovalent alum salts are separated from the crystallization slurry from alum crystallization by filtration or decantation, forming a filtrate, the filtrate containing greater than about 95% of the lithium contained from the initial ore containing one or more lithium bearing mica rich minerals.

18. The process according to claim 16, wherein the monovalent alum salts are separated from the crystallization slurry after alum crystallization by filtration or decantation, forming a lithium containing filtrate, the filtrate containing greater than about 95% of the lithium contained from the initial ore containing one or more lithium bearing mica rich minerals, and impurities present in the lithium containing filtrate are removed by precipitation through the addition of an acid in a low pH impurity removal step.

19. The process according to claim 18, wherein solids from the low pH impurity removal step are washed with water to recover entrained lithium.

20. The process according to claim 18, wherein from the low pH impurity removal step filtrate is passed to a high pH impurity removal step, in which impurity base metals, including either manganese or magnesium, are precipitated through the addition of a base.

21. The process according to claim 18, wherein from the low pH impurity removal step filtrate is passed to a high pH impurity removal step, in which impurity base metals, including either manganese or magnesium, are precipitated through the addition of a base, and calcium is precipitated from a filtered product of the high pH impurity removal step by the addition of a monovalent carbonate salt.

22. The process according to claim 21, wherein lithium carbonate is precipitated by the addition of a monovalent carbonate salt to the filtered product of calcium precipitation.

23. The process according to claim 16, wherein the mixed monovalent alum salts are re-dissolved in water and passed to selective precipitation to precipitate $Al(OH)_3$.

24. The process according to claim 23, wherein precipitated $Al(OH)_3$ from selective precipitation is separated by filtration or decantation, whereby a resulting filtrate contains monovalent cation salts.

25. The process according to claim 23, wherein precipitated $Al(OH)_3$ from selective precipitation is separated by filtration or decantation, whereby a resulting filtrate contains rubidium and cesium sulfates that are further processed to provide formates.

26. The process according to claim 16, wherein fluoride is recovered from the lithium bearing mica rich minerals by way of the additional method steps:
   a) Selective crystallization of khademite from the filtrate arising from the separation of the monovalent alum salts from the crystallization slurry, producing a fluoride crystallization slurry; and
   b) Separation of the crystallized khademite from the fluoride crystallization slurry by filtration or decantation.

* * * * *